United States Patent [19]

Grubbs et al.

[11] Patent Number: 5,728,785
[45] Date of Patent: Mar. 17, 1998

[54] ROMP POLYMERIZATION IN THE PRESENCE OF PEROXIDE CROSSLINKING AGENTS TO FORM HIGH-DENSITY CROSSLINKED POLYMERS

[75] Inventors: Robert H. Grubbs, South Pasadena, Calif.; Charles S. Woodson, Jr., Monroe, La.

[73] Assignee: California Institute of Technology, Pasadena, Calif.

[21] Appl. No.: 678,397

[22] Filed: Jul. 2, 1996

[51] Int. Cl.$^6$ ............................................. C08F 2/00
[52] U.S. Cl. ........................................ 526/142; 525/50
[58] Field of Search ........................... 526/135, 171, 526/138, 142

[56] References Cited

U.S. PATENT DOCUMENTS

| | | | |
|---|---|---|---|
| 3,959,234 | 5/1976 | Kurosawa | 526/109 |
| 4,883,851 | 11/1989 | Grubbs et al. | 526/268 |
| 4,945,135 | 7/1990 | Grubbs et al. | 525/338 |
| 4,945,144 | 7/1990 | Grubbs et al. | 526/268 |
| 5,069,943 | 12/1991 | Hara et al. | |
| 5,198,511 | 3/1993 | Brown-Wensley et al. | 526/113 |
| 5,274,026 | 12/1993 | Benedikt | 524/553 |
| 5,296,566 | 3/1994 | Brown-Wensley et al. | 526/171 |
| 5,312,940 | 5/1994 | Grubbs et al. | 526/136 |
| 5,342,909 | 8/1994 | Grubbs | 526/171 |

OTHER PUBLICATIONS

Burrell et al., "Synthesis and Reactions of Ru(=CH$_2$) Cl (No)$_2$, A Stable Terminal MethyleneComplex and the Crystal Structure of Ru(CH$_2$PPF$_2$)$_2$(n$^2$–C$_2$F$_4$Cl (N)) (PPH$_3$)", J. Chem. Soc., Dalton Trans., 1991, pp. 609–614.
Ivin, K.J. "Olefin Metathesis", 1983, Academic Press, pp. vii–x, 34–36.
McGrath et al., "Aqueous Ring–Opening Metathesis Polymerization of 7–Oxanorbornene Derivatives Using Ruthenium Catalysts", 1990, pp. 525–536.
Novak et al., "Catalytic Organometalic Chemistry in Water: The Aqueous Ring–Opening Metathesis Polymerization of 7–Oxanorbornene Derivatives", 1988, JACS, vol. 110, pp. 7542–43g.
Hillmyer et al., "The Aqueous Ring–Opening Metathesis Polymerization of exo–N–Methyl–7–oxabicyclo [2.2.1] hept–5–ene–2, 3–dicarbonximide" 1991, pp. 162–163.
Carter et al., "Review of the Chemistry of Cyclopropane Compounds", Apr. 20, 1964, pp. 497–525.
Schmidbaur et al., "Ylide Chemistry: An Account of Structural, Conformational and Redox Investigations" 1983m pp. 167–170.
"Metathesis of Functionalized Olefin", J. of Molecules Catalysis, 15 (1982), pp. 35–45.
Bruce et al., "Cyclopentadienyl–Ruthenium and –osmium Chemistry. Some Reactions ofSubstituted Vinylidene Complexes," J. Organometallic Chem. 171:C5–C8 (1979).
M.H.L. Green et al., "Carbene Complexes of Iron, Molybdenum, and Ruthenium: A NewRoute to Metal–Carbene Derivatives," J. Chem. Soc. (A) 794–797 (1971).

H. Le Bozec et al., "A New Route to Vinylcarbene Metal Complexes in One Step from2–Propyn–1–ols and Arene Ruthenium (∥) Derivatives," J. Chem. Soc. Chem. Comm. 219–221 (1989).
Grundy et al., "Migratory–Insertion Reactions of Osmium (II) Ethyl Complexes DerivedFrom an Osmium (0) Ethylene Complex," J. Organometallic Chem. 216:255–262 (1981).
Grundy et al., "Propionyl Complexes of Ruthenium Derived From the Reaction of Ethylenewith RuHCl (CO)$_2$(PPh$_3$)$_2$ "J. Organometallic Chem. 265:77–85 (1984).
Richard R. Schrock, "Living Ring–Opening Metathesis Polymerization Catalyzed by Well–Characterized Transition–Metal Alkylidene Complexes", Acc.Chem.Res. 1990, vol. 23, pp. 158–165.
Gregory C. Fu et al., "Catalytic Ring–Closing Metathesis of Functionalized Dienes by a Ruthenium Carbene Complex" Am. Chem Soc. 1993, pp. 9856–9857.
Robert H. Grubbs et al., "Ring–Opening Metathesis Polymerization Catalysts" Polymer Preprints 1994, 35(1), p. 688.

(List continued on next page.)

*Primary Examiner*—Christopher Henderson
*Attorney, Agent, or Firm*—Limbach & Limbach L.L.P.

[57] ABSTRACT

Methods of forming polycycloolefins having high crosslink density are disclosed. Olefins are polymerized via a metathesis mechanism in the presence of a crosslinking agent and a catalyst. The crosslinking agent generally comprises a peroxide that decomposes into reactive species forming crosslinks during post-cure. The catalyst is a ruthenium or osmium carbene complex of the formula:

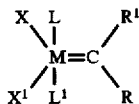

wherein M is Os or Ru; R and R$^1$ are independently selected from hydrogen or a hydrocarbon selected from the group consisting of C$_1$–C$_{20}$ alkyl, C$_2$–C$_{20}$ alkenyl, C$_2$–C$_{20}$ alkynyl, C$_2$–C$_{20}$ alkoxycarbonyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy and aryloxy; X and X$^1$ are independently selected from any anionic ligand; and L and L$^1$ are independently selected from any neutral electron donor. Preferably, L and L$^1$ are trialkylphosphine ligands and at least one of the alkyl groups on the phosphine ligand may be a secondary alkyl or cycloalkyl group, especially P(isopropyl)$_3$, P(cyclopentyl)$_3$ and P(cyclohexyl)$_3$.

Preferred crosslinking agents are peroxides, such as t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane or mixtures thereof.

Olefins may be cyclic (e.g., monocyclic, bicyclic or tricyclic) or acyclic. Norbornene or norbornene derivatives are especially preferred.

22 Claims, No Drawings

OTHER PUBLICATIONS

Marc A. Hillmyer et al., "The ROMP of COD by a Well–Defined Metathesis Catalyst in the Presence of a Difunctional Chain Transfer Agent: The Preparation of Hydroxy–Telechelic 1,4–Poly(butadiene)". Polymer Preprints 1993, 34(2), pp. 388–389.

Marc A. Hillmyer et al., "Preparation of Hydroxytelechelic Poly(butadiene) via Ring–Opening Metathesis Polymerization Employing a Well–Defined Metathesis Catalyst" Am. Chem Soc. Macromolecules, vol. 26, No. 4, 1992, pp. 872–874.

SonBinh R. Nguyen et al., "Syntheses and Activities of New Single–Component Ruthenium–Based Olefin Metathesis Catalysts" J. Am. Chem Soc. 1993, 115, 9858–9859.

SonBinh R. Nguyen et al., "Ring–Opening Metathesis Polymerization (ROMP) of Norbornene by a Group VIII Carbene Complex in Protic Media", J. Am. Schem. Soc. 1992, 114, 3974–3975.

ROMP POLYMERIZATION IN THE PRESENCE OF PEROXIDE CROSSLINKING AGENTS TO FORM HIGH-DENSITY CROSSLINKED POLYMERS

FIELD OF THE INVENTION

The present invention relates to a method of making polymers with high density crosslinking. More particularly, the present invention relates to olefin metathesis polymerization, methods to form polymers having high density crosslinking.

BACKGROUND

The metathesis polymerization of cyclic olefins leads to high polymers through ring opening metathesis polymerization (ROMP). The original catalysts used for ROMP were of the Ziegler type. These catalysts were rather ill-defined, formed by reaction of an early transition metal halide with a reducing agent such as an alkyl aluminum.

A metathesis polymerization that has been explored commercially is reaction injection molding (RIM) of dicyclopentadiene monomer, as shown in Reaction 1.

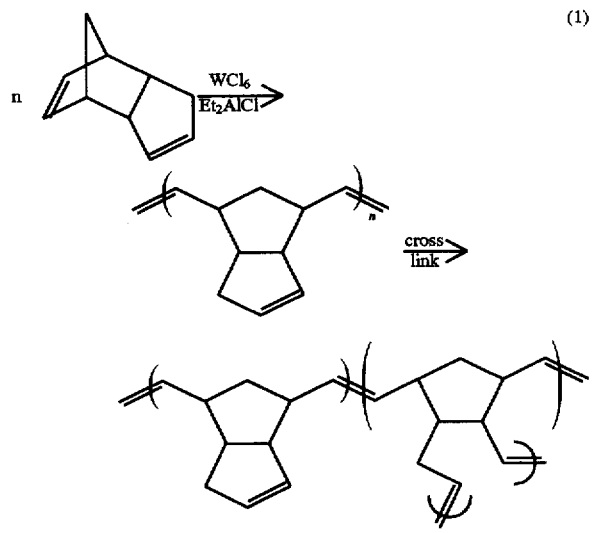

(1)

In this process, the metal halide and reducing agent components are separately mixed with the monomer. On mixing, the catalyst is formed and the mixture is injected into a mold for curing.

A variety of catalysts based on tungsten or molybdenum have been described for this type of polymerization, as disclosed in, for example, U.S. Pat. Nos. 4,400,340, 4,380, 617 and 4,701,510. Increased solvent resistance, e.g., low gel swell, of the resulting polymers may be achieved by addition of low levels of crosslinking agents. However, typically, in these reactions, the monomer must be highly purified and catalyst poisons such as water and alcohols must be avoided.

Over the past eight years, well-defined early transition metal catalysts for ROMP of cyclic olefins have been developed. Exemplary catalysts include those disclosed in L. K. Johnson, et al., *J. Am. Chem. Soc.*, 115, 8167–8177 (1993) and D. L. Gin, et al., *J. Am. Chem. Soc.*, 114, 3167–3169 (1992). These catalysts are simple organometallic complexes containing multiple metal carbon bonds that, in most cases, polymerize olefins by a "living" process.

These catalysts have been used to prepare near monodispersed and structurally homogeneous polymers. See, for example, R. H. Grubbs, *Pure Appl. Chem.* A31(11), 1829–1833 (1994) and U.S. patent application Ser. No. 08/282,827 filed Jul. 29, 1994 and U.S. patent application Ser. No. 08/708,057, filed Aug. 30, 1996 (both currently pending), assigned to the assignee of the present invention, all of which are incorporated herein by reference. Although the first such catalysts studied were based on tungsten and molybdenum, an active series of Group VIII ROMP catalysts has recently been prepared. These new catalysts allow a wide range of functionality to be incorporated into the polymer side chains; the most important members of this family of complexes are the bisphosphine dihaloruthenium carbene complexes. See, for example, S. T. Nguyen, et al., *J. Am. Chem. Soc.*, 115, 9858–9859 (1993) and U.S. Pat. No. 5,312,940, incorporated herein in their entireties by reference. These same catalysts can also be used to synthesize fine chemicals and block copolymers. See, for example, G. C. Fu, et al., *J. Am. Chem. Soc.*, 115, 9856–9857 (1993); Z. Wu, et al., *Macromolecules*, 26, 4975–4977 (1993); Z. Wu, et al., *Macromolecules* 27, 6700–6703 (1994); L. K. Johnson, et al., *J. Am. Chem. Soc.*, 115, 8130–8145 (1993); S. T. Nguyen, et al., *J. Am. Chem. Soc.*, 114, 3974–3975 (1992); and B. T. Flatt, et al., *Organometallics*, 13, 2728–2732 (1994).

The first well-defined ruthenium metathesis catalyst was prepared by the reaction of tris(triphenylphosphine) ruthenium dichloride with diphenylcyclopropene as shown in Reaction 2.

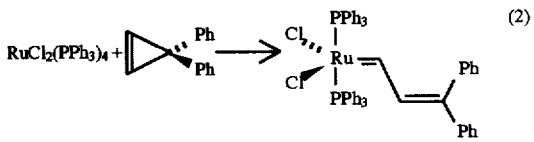

(2)

Compounds based on other ruthenium analogs such as phosphorous (Wittig-type) reagents or diazomethane derivatives prepared by other methods also catalyze metathesis reactions.

The above-mentioned ruthenium carbene complexes catalyze the living polymerization of norbornene or other strained olefins such as trans-cyclooctene. The resulting norbornene polymers can be end-capped and show polydispersities of 1.2. The breadth of the dispersity is a result of the slow initiation of the catalyst relative to the rate of polymerization. It was found that a simple exchange of the triphenylphosphine ligand for a tricyclohexyl phosphine resulted in a dramatic increase in activity. The tricyclohexyl phosphine ruthenium carbene catalyst polymerizes unstrained olefins and induces metathesis of acyclic olefins, as shown in Reaction 3.

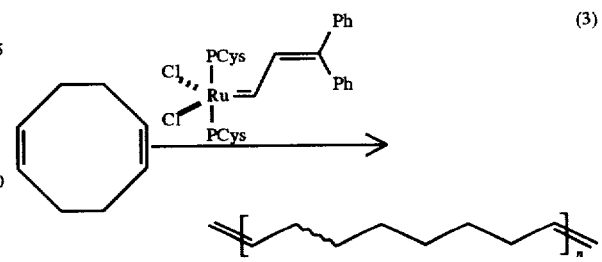

(3)

The application of the tricyclohexyl phosphine ruthenium (or osmium) carbene catalysts in the polymerization of norbornene and norbornene-like derivatives such as dicyclopentadiene (DCPD) in aqueous or nonaqueous solvents is described in U.S. Pat. No. 5,342,909, also incorporated herein by reference.

Polymers having high density crosslinking are desirable for their improved mechanical strength and low gel swell. Often, crosslinking is achieved by use of a compound that reacts with the polymer to form crosslinks. For processing ease, crosslinking agents are often added in the reaction mixture containing the monomer and catalyst. Where these agents alter or inhibit the polymerization reaction or poison the catalyst, other means must be found for achieving crosslinking.

SUMMARY OF THE INVENTION

The present invention overcomes these disadvantages by permitting catalytic metathesis polymerization of olefins in the presence of a modifier. Polymers with very high crosslink density can be produced simply and efficiently in the presence of the modifier without inactivating the catalyst. The resulting polymers are solvent resistant and mechanically strong. Also, certain monomers having lower purity (e.g., 85–95% dicyclopentadiene) than can be successfully polymerized with conventional methods can be polymerized according to the present invention to produce a high crosslink density material using previously reported metathesis catalysts.

Generally, in methods according to the present invention, the "modifier" or crosslinking agent is mixed with the monomer, e.g., a cyclic olefin, and the catalyst. The monomer polymerizes via a metathesis mechanism and then the crosslinking agent decomposes, e.g., at an elevated temperature, to form active species which react with the resulting polymer to form crosslinks. The catalyst is not deactivated or poisoned in the presence of the modifier.

In one embodiment, the invention is a method of forming a polycycloolefin comprising the step of mixing an olefin with a catalyst in the presence of a crosslinking agent peroxide wherein the crosslinking agent comprises a peroxide, and the catalyst is a ruthenium or osmium carbene complex of the formula:

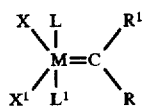

wherein:

M is Os or Ru;

R and $R^1$ are independently selected from hydrogen or a hydrocarbon selected from the group consisting of $C_1$–$C_{20}$ alkyl, $C_2$–$C_{20}$ alkenyl, $C_2$–$C_{20}$ alkynyl, $C_2$–$C_{20}$ alkoxycarbonyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy and aryloxy;

X and $X^1$ are independently selected from any anionic ligand; and

L and $L^1$ are independently selected from any neutral electron donor.

In another embodiment, the invention is a method of forming a polycycloolefin comprising the step of polymerizing an olefin with a catalyst in the presence of a peroxide as set forth above; decomposing the peroxide in the polymer to form reactive species of the peroxide; and using the reactive species to form crosslinks in the polymer.

In any of these embodiments, the polymer formed from the metathesis reaction can be post-cured at elevated temperature to produce a polymer with high density crosslinking.

Suitable monomers include those capable of being polymerized by metathesis reactions, such as cyclic olefins (including monocyclic olefins and bi- and tricyclic diolefins) and acyclic olefins, such as an acyclic di- or higher olefin.

Preferred catalysts for the method include those where L and $L^1$ are independently selected from the group consisting of P(isopropyl)$_3$, P(cyclopentyl)$_3$ and P(cyclohexyl)$_3$.

Preferred crosslinking agents are peroxides, such as alkyl peroxides, particularly tert-butyl peroxide or di-t-butyl peroxide, 2,5-dimethyl-2,5-di-(tert-butylperoxy) hexyne-3, 2,5-dimethyl-2,5-di-(tert-butylperoxy) hexane or mixtures thereof. The amount of peroxide in the reaction mixture is preferably between 0.01 v % to 10 v % of the total monomer/catalyst/crosslinking agent mixture.

The polymerization can be carried out in the absence of a solvent.

DETAILED DESCRIPTION

Generally, a method according to the present invention involves mixing the catalyst, monomer and modifier together at room temperature until the viscosity of the mixture has increased to just below the pour point. The mixture is then poured into a mold which has been preheated, preferably between about 35°–45° C. to about 140° C.

Time to exotherm of the polymerization reaction is generally between about 5 minutes and 6 hours, at which time the viscosity of the mixture increases rapidly.

The time to exotherm during the metathesis is determined by, among other factors, the monomer to catalyst ratio in the mixture and the purity of the monomer. Monomer to catalyst ratios may be between about 100:1 and about 10,000:1. The ratio for a specific monomer and catalyst may fall outside of this range in order to control the final properties of the polymer produced. At ratios of about 100:1, the polymer tends to be relatively hard, whereas at ratios of about 10,000:1, the resulting polymer tends to be soft. Ratios higher than 10,000:1 would be expected to produce even softer polymers.

Shortly after the exotherm, the polymer is removed from the mold and then post-cured at an elevated temperature, preferably above the decomposition point of the peroxide and for about a time period equivalent to 1–3 half lives of the peroxide at that temperature. High density crosslinking is achieved in the polymer during post-cure.

Catalysts suitable for use in methods according to the present invention include ruthenium or osmium carbene complexes which are stable in the presence of a variety of functional groups and which can be used to catalyze olefin metathesis reactions on unstrained cyclic and some acyclic olefins. These catalysts and methods for making them are disclosed in U.S. Pat. Nos. 5,342,909 and 5,312,940, each of which is incorporated herein by reference. Generally, these catalysts may be described by the formula

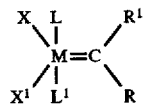

wherein:

M is Os or Ru;

R and $R^1$ are independently selected from hydrogen or a hydrocarbon selected from the group consisting of $C_1$–$C_{20}$ alkyl, $C_2$–$C_{20}$ alkenyl, $C_2$–$C_{20}$ alkynyl, $C_2$–$C_{20}$ alkoxycarbonyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy and aryloxy;

X and $X^1$ are independently selected from any anionic ligand; and

L and $L^1$ are independently selected from any neutral electron donor. Any two or three of X, $X^1$, L and $L^1$ may be optionally bonded together to form a chelating multidentate ligand.

Exemplary L and $L^1$ include phosphine, sulfonated phosphine, phosphite, phosphinite, phosphonite, arsine, stibine, ether, amine, amide, sulfoxide, carbonyl, nitrosyl, pyridine or thioether.

In a preferred embodiment, the metathesis polymerization according to the present invention is carried out using a ruthenium or osmium carbene catalyst according to the formula above wherein L and $L^1$ are trialkylphosphines, and especially those in which at least one of the alkyl groups on the phosphine is a secondary alkyl or cycloalkyl group, such as a cyclopentyl, cyclohexyl or isopropyl group as set forth in U.S. patent application Ser. Nos. 08/282,827 and 08/708, 057.

It may be desirable to protect some catalysts used in the present invention from the atmosphere, e.g., oxygen. For example, $(P(cyclopentyl)_3)_2Cl_2RuCHCHPh_2$ and its cyclohexyl phosphine analog may be stored in a dry box under a nitrogen atmosphere until needed. In the dry box, the desired amount of catalyst can be weighed into a vial, capped and removed from the glove box for use in polymerization reactions.

Suitable monomers include olefins capable of being polymerized according to metathesis mechanisms, such as norbornene derivatives, including dicyclopentadiene. The monomers may be cyclic or acyclic, with the latter being at least a diolefin in order to polymerize.

Pretreatment of the monomer before contact with the catalyst may be desirable. For example, DCPD may be commercially supplied as 95% pure; p-tert-butylcatechol is an additive to prevent premature free radical polymerization. Before metathesis polymerization, the monomer may be purified. Filtration of the DCPD through activated neutral aluminum oxide (Fluka #06300) removes the antioxidant.

Since the catalysts are stable in the presence of functional groups, monomer can be mixed with a modifier, such as a peroxide, prior to polymerization. Of particular value are certain alkylperoxides, in an amount typically between 0.01–10 v %. (The higher amounts in this range tend to reduce the degree of polymerization.) Alkyl peroxides such as t-butyl peroxide, including di-t-butyl peroxide, provide polymers with desirably high crosslink density. Two preferred peroxides are commercially available under the tradenames LUPERSOL 130 (from ELS Atochem North America Inc. Fine Chemicals Group), containing 2,5-dimethyl-2,5-di(tert-butylperoxy) hexyne-3 and di-t-butyl peroxide, and LUPERSOL 101, containing 2,5-dimethyl-2,5-di(tert-butylperoxy) hexane and di-tert-butyl peroxide.

In a method according to the present invention, preferably after the exotherm of the polymerization reaction and during post-cure, the peroxide decomposes at the elevated temperature, forming free radicals or other reactive species. The resulting polymer has a greatly increased solvent resistance, believed to be due to an increased crosslink density.

Increased crosslink density correlates to decreased gel swell. As shown in Table I, discussed in greater detail below, polymers prepared according to the present invention been found to have dramatically increased solvent resistance compared to polymers prepared using the same ruthenium catalysts but without peroxide addition.

EXAMPLE 1

Purification of DCPD Monomer 500 mL DCPD is filtered under vacuum into a one liter round bottom flask through a 150 mL medium porosity sintered glass fritted funnel containing one inch of aluminum oxide. Prior to use, the aluminum oxide is stored in an oven at 120° C. Lower grades of DCPD with lower freezing points can be used after similar purifying treatment.

EXAMPLE 2

Degassing of DCPD Monomer

To the round bottom flask, containing purified DCPD as above, is added a 1-inch magnetic stir bar. The flask is placed in a water bath 30°–35° C. and under 0.10 mm Hg vacuum with stirring for 1.5 hours. The degassed DCPD is then stored under vacuum and protected from light to prevent premature free radical polymerization.

EXAMPLE 3

DCPD Polymerization without Peroxide

To a 250 mL Erlenmeyer flask containing a 1-inch magnetic stir bar, DCPD, purified and degassed, as described above, (147.9 g, 150 mL, 1.12 mol, 5000 eq) and $(P(cyclopentyl)_3)_2Cl_2RuCHCHPh_2$ (188.5 mg, 0.224 mmol, 1 eq) were added. Stirring was initiated and a slow flow of argon was introduced into the flask. The orange solution was stirred at room temperature for 8 minutes under argon until it became highly viscous. The solution was then poured open to air into a crystallization dish (14.6 cm in diameter) that had been previously stored at 120° C. After 2 minutes, the solution began to gel, and the production of smoke was observed over the following 2 minutes. At this point, the polymerization appeared complete and the crystallization dish cooled to room temperature. The polymer separated from the sides of the crystallization dish easily. The polymer was post-cured at 120° C. for 3 hours, resulting in poly (DCPD) (141.1 g, 95.4% yield).

EXAMPLE 4

DCPD Polymerization with Peroxide

To a 250 mL Erlenmeyer flask containing a 1-inch magnetic stir bar, DCPD, purified and degassed, as described above, (147.9 g, 150 mL, 1.12 mol, 5000 eq) and $(P(cyclopentyl)_3)_2Cl_2RuCHCHPh_2$ catalyst (188.5 0.224 mmol, 1 eq) were added. LUPERSOL 130 (4.5 mL, 3% v/v) was then added and stirring was initiated under a slow flow of argon. The orange solution was stirred at room temperature for 8 minutes under argon until it became highly viscous. The solution was then poured open to air into a crystallization dish (14.6 cm in diameter) preheated to 120° C. After 2 minutes, the solution began to gel, and the production of smoke was observed over the following 2 minutes. At this point, the polymerization appeared complete and the crystallization dish cooled to room temperature. The polymer separated from the sides of the crystallization dish easily and was post-cured at 120° C. for 3 hours. Poly(DCPD) was produced (139.4 94.3% yield).

EXAMPLE 5

Gel Swell of poly(DCPD)

Table 1, below, summarizes the comparative results of gel swell experiments of poly(DCPD) prepared according to the prior art and to methods according to the present invention.

Poly(DCPD) according to the present invention was prepared as follows. To a 250 mL Erlenmeyer flask containing a 1½-inch magnetic stir bar, DCPD, purified and degassed, as described above (67.1 g. 68.1 mL, 0.51 mole, 4000 equiv.) was added, followed by LUPERSOL 130 (0.68 mL, 1% v/v). The mixture was stirred slowly for three minutes under nitrogen flow.

(P(cyclopentyl)$_3$)$_2$Cl$_2$RuCHCHPh$_2$ (106.0 mg, 0.126 mmol, 1 equiv.) was added as the mixture was stirred. Stirring under nitrogen at room temperature continued until the mixture became highly viscous, after about 7 minutes, 30 seconds. The solution was then poured into an open to air aluminum mold (2.54 cm×1.27 cm×20.32 cm long) previously stored at 40° C. After approximately 3 minutes, the solution began to gel with a peak exotherm at 14 minutes and 35 seconds at a temperature of 157° C. At this point, polymerization appeared complete and the mold cooled to room temperature. The resulting polymer was removed from the aluminum mold and post-cured at 190° C. for 1½ hours.

Gel swell samples were weighed and placed in a flask containing either ortho-xylene or toluene as a solvent and held at reflux for several hours. After heating in the solvent for a desired period of time, the pieces were removed, dried and reweighed. The percent gel swell was calculated by dividing the weight gain by the original weight and multiplying by 100.

invention. The technique of addition of these peroxides and post-cure according to the invention results in poly(DCPD) exhibiting almost no gel swell. The poly(DCPD) made according to the present invention thus has increased resistance to solvent absorption.

Table 1 also includes data for unsuccessful attempts to polymerize DCPD in the presence of various other peroxides (runs 11, 14, 17, 18 and 19). A visual inspection of these samples revealed that little or no polymerization occurred. It is believed that polymerization was not achieved because of catalyst poisoning by these peroxides or other inhibition of the polymerization reaction.

The table also includes data (runs 1 and 2) which suggests that post cure at 120° C./1.5 hours is less effective at producing high density crosslinking than post cure at 190° C./1 hour.

While the present invention is disclosed by reference to the preferred embodiments and examples detailed above, it is to be understood that these examples are intended in an illustrative rather than limiting sense, as it is contemplated that many modifications within the scope and spirit of the invention will readily occur to those skilled in the art and the appended claims are intended to cover such variations.

TABLE I

| Run | Monomer/ Catalyst | Peroxide % vol. | Gel Well before Cure | Gel Swell after Post Cure | Post Cure | Condition for Gel Swell | Peroxide Type |
|---|---|---|---|---|---|---|---|
| 1 | 5000:1 | 0 | — | 155% | 120° C./1½h | B | E |
| 2 | 5000:1 | 3% | — | 116% | 120° C./1½h | B | E |
| 3 | 5000:1 | 0 | 70.85% | — | — | A | |
| 4 | 5000:1 | 0 | — | 67.28% | 190° C./1½h | A | |
| 5 | 5000:1 | 0 | — | 62.49% | 190° C./1½h | A | |
| 6 | 5000:1 | 3% | 51.40% | — | — | A | E |
| 7 | 5000:1 | 3% | — | 0.35% | 190° C./1½h | A | E |
| 8 | 5000:1 | 3% | — | 0.51% | 190° C./1½h | A | E |
| 9 | 5000:1 | 1% | 65.45% | — | — | A | E |
| 10 | 5000:1 | 1% | — | 0% | 190° C./1 h | A | E |
| 11 | 7500:1 | 3% | — | Did Not React[1] | | | H |
| 12 | 5000:1 | 4% | — | 1.78% | 190° C./1 h | D | F |
| 13 | 5000:1 | 4% | — | 1.31% | 190° C./1 h | D | F |
| 14 | 7500:1 | 3% | — | Did Not React[1] | — | | I |
| 15 | 7500:1 | 4% | — | 1.60% | 190° C./1 h | C | G |
| 16 | 7500:1 | 4% | — | 1.22% | 190° C./1 h | C | G |
| 17 | 5000:1 | 0.4% | — | Did Not React[1] | | | J |
| 18 | 5000:1 | 1% | — | Did Not React[1] | | | K |
| 19 | 5000:1 | 1% | — | Incomplete Reaction[1] | | | L |

[1] From visual examination of sample
A: 11 hours ortho-xylene at reflux
B: 2 hours toluene at reflux
C: 8 hours ortho-xylene at reflux
D: 10½hours ortho-xylene at reflux
E: LUPERSOL 130
F: t-butyl peroxide 98%
G: LUPERSOL 101
H: Benzoyl peroxide 97%
I: LUCIDOL 75 (tradename for benzoyl peroxide, commercially available from Elf Atochem North America Inc.)
J: t-amyl Perbenzoate
K: t-butyl Hydroperoxide
L: LUPERSOL 231

As can be seen in the table, gel swell is dramatically reduced for poly(DCPD) polymerized in the presence of certain peroxides (types E and G [LUPERSOL 130 and 101, respectively] and type F [t-butylperoxide]), according to the

We claim:

1. A method of forming a polycycloolefin comprising the step of polymerizing an olefin in the presence of a crosslinking agent and a catalyst, wherein said crosslinking agent comprises a peroxide selected from the group consisting of t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane or mixtures thereof and said catalyst is a ruthenium or osmium carbene complex of the formula:

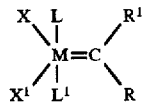

wherein:

M is Os or Ru;

R and $R^1$ are independently selected from hydrogen or a hydrocarbon selected from the group consisting of $C_1$–$C_{20}$ alkyl, $C_2$–$C_{20}$ alkenyl, $C_2$–$C_{20}$ alkynyl, $C_2$–$C_{20}$ alkoxycarbonyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy and aryloxy;

X and $X^1$ are independently selected from any anionic ligand; and

L and $L^1$ are independently selected from any neutral electron donor.

2. A method according to claim 1, wherein the amount of crosslinking agent is between about 0.01 v % and about 10 v % of the mixture of catalyst, crosslinking agent and olefin.

3. A method according to claim 1, wherein the olefin is cyclic or acyclic.

4. A method according to claim 1, wherein L and $L^1$ are trialkylphosphine ligands.

5. A method according to claim 4, wherein L and $L^1$ are independently selected from the group consisting of P(isopropyl)$_3$, P(cyclopentyl)$_3$ and P(cyclohexyl)$_3$.

6. A method according to claim 1, wherein the polymerization occurs in the absence of a solvent.

7. A method according to claim 3, wherein the cyclic olefin is norbornene or a norbornene derivative.

8. A method according to claim 7, wherein the cyclic olefin is dicyclopentadiene.

9. A method of forming a polycycloolefin comprising the steps of:

a) polymerizing an olefin with a catalyst to form a polycycloolefin polymer in the presence of a peroxide selected from the group consisting of t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane or mixtures thereof, wherein said catalyst is a ruthenium or osmium carbene complex of the formula:

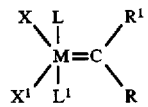

wherein:

M is Os or Ru;

R and $R^1$ are independently selected from hydrogen or a hydrocarbon selected from the group consisting of $C_1$–$C_{20}$ alkyl, $C_2$–$C_{20}$ alkenyl, $C_2$–$C_{20}$ alkynyl, $C_2$–$C_{20}$ alkoxycarbonyl, aryl, $C_1$–C20 carboxylate, $C_1$–$C_{20}$ alkoxy, $C_2$–$C_{20}$ alkenyloxy, $C_2$–$C_{20}$ alkynyloxy and aryloxy;

X and $X^1$ are independently selected from any anionic ligand; and

L and $L^1$ are independently selected from any neutral electron donor;

b) decomposing the peroxide in the polymer to form reactive species of said peroxide; and c) using said reactive species to form crosslinks in the polymer.

10. A method according to claim 9, wherein L and $L^1$ are trialkylphosphine ligands.

11. A method according to claim 10, wherein, in said catalyst, L and $L^1$ are independently selected from the group consisting of P(isopropyl)$_3$, P(cyclopentyl)$_3$ and P(cyclohexyl)$_3$.

12. A method according to claim 9, wherein the amount of peroxide is between about 0.01 v % and about 10 v % of the mixture of catalyst, peroxide and olefin.

13. A method according to claim 9, wherein the olefin is cyclic or acyclic.

14. A method according to claim 13, wherein the cyclic olefin is norbornene or a norbornene derivative.

15. A method according to claim 14, wherein the cyclic olefin is dicyclopentadiene.

16. A method according to claim 9, wherein the polymerization occurs in the absence of a solvent.

17. A method for metathesis polymerization of olefins, comprising the steps of:

a) forming a polycycloolefin polymer in the presence of a peroxide selected from the group consisting of t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane or mixtures thereof and a catalyst, wherein the catalyst is (P(cyclopentyl)$_3$)$_2$Cl$_2$RuCHPh or (P(cyclohexyl)$_3$)$_2$Cl$_2$RuCHPh;

b) decomposing the peroxide to form free radical species in the polymer; and c) crosslinking the polymer with the free radicals.

18. A method according to claim 17, wherein the olefin is cyclic or acyclic.

19. A method according to claim 18, wherein the cyclic olefin is norbornene or a norbornene derivative.

20. A method according to claim 19, wherein the cyclic olefin is dicyclopentadiene.

21. A method according to claim 17, wherein the amount of peroxide is between about 0.01 v % and about 10 v % of the mixture of catalyst, peroxide and olefin.

22. A method according to claim 17, wherein the polymerization occurs in the absence of a solvent.

* * * * *

UNITED STATES PATENT AND TRADEMARK OFFICE
CERTIFICATE OF CORRECTION

| | | |
|---|---|---|
| PATENT NO. | : 5,728,785 | Page 1 of 1 |
| APPLICATION NO. | : 08/678397 | |
| DATED | : March 17, 1998 | |
| INVENTOR(S) | : Robert H. Grubbs et al. | |

It is certified that error appears in the above-identified patent and that said Letters Patent is hereby corrected as shown below:

On the Title page,

> Add the following:
>
> --RELATED U.S. APPLICATION DATA--
>
> --(60) Provisional application No. 60/000,953, filed on Jul 7, 1995.--

In Column 1, Line 5, after the title please add the following paragraph,

> --This application claims benefit of priority under 35 U.S.C. § 119(e) from U.S. Provisional Application Serial No. 60/000,953, filed July 7, 1995.--

Signed and Sealed this

First Day of May, 2007

JON W. DUDAS
*Director of the United States Patent and Trademark Office*